United States Patent
Berg

(10) Patent No.: US 7,866,766 B2
(45) Date of Patent: Jan. 11, 2011

(54) LIGHT WEIGHT TRACK FOR A SNOWMOBILE

(75) Inventor: Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 268 days.

(21) Appl. No.: 12/009,016

(22) Filed: Jan. 16, 2008

(65) Prior Publication Data

US 2008/0174176 A1      Jul. 24, 2008

Related U.S. Application Data

(60) Provisional application No. 60/885,165, filed on Jan. 16, 2007.

(51) Int. Cl.
*B62D 55/24* (2006.01)

(52) U.S. Cl. .................. 305/178; 305/165; 305/166

(58) Field of Classification Search ................. 305/157, 305/158, 165, 166, 167, 177, 178, 179, 180
See application file for complete search history.

(56) References Cited

U.S. PATENT DOCUMENTS

| | | | | | |
|---|---|---|---|---|---|
| 3,118,709 | A | * | 1/1964 | Case | ............... 305/170 |
| 3,161,443 | A | * | 12/1964 | Svensson | ............... 305/112 |
| 3,582,154 | A | | 6/1971 | Russ | |
| 3,602,364 | A | | 8/1971 | Maglio et al. | |
| 3,700,287 | A | | 10/1972 | Persin | |
| 3,722,962 | A | | 3/1973 | Cooper | |
| 3,781,067 | A | | 12/1973 | Dodson et al. | |
| 3,900,231 | A | * | 8/1975 | Ohm | ............... 305/178 |
| 3,911,051 | A | | 10/1975 | Schouten et al. | |
| 4,303,278 | A | | 12/1981 | Fehling | |
| 4,390,214 | A | | 6/1983 | Gunter et al. | |
| 4,490,321 | A | | 12/1984 | Klinka | |
| 4,714,302 | A | * | 12/1987 | Svensson et al. | ............ 305/179 |
| 4,758,055 | A | | 7/1988 | Anderson | |
| 4,915,895 | A | | 4/1990 | Savage et al. | |
| 4,919,876 | A | | 4/1990 | Savage et al. | |
| RE33,324 | E | | 9/1990 | Edwards et al. | |
| 5,053,179 | A | | 10/1991 | Masui et al. | |
| 5,238,725 | A | | 8/1993 | Effing et al. | |
| 5,453,240 | A | | 9/1995 | D'Hooren | |
| 5,540,489 | A | * | 7/1996 | Muramatsu et al. | ......... 305/197 |

(Continued)

FOREIGN PATENT DOCUMENTS

EP      0934867  A1      8/1999

(Continued)

OTHER PUBLICATIONS

International Search Report for PCT/US07/04607 issued by International Search Authority/US on Oct. 3, 2007.

(Continued)

*Primary Examiner*—Russell D Stormer
(74) *Attorney, Agent, or Firm*—Baker & Daniels LLP

(57) ABSTRACT

A ground engaging track for a vehicle has a continuous loop or endless belt body portion having an exterior surface to engage the ground and an interior surface including driven members. The driven members are configured to be engaged by a drive sprocket to rotate the body portion to move the vehicle.

55 Claims, 3 Drawing Sheets

U.S. PATENT DOCUMENTS

| | | | |
|---|---|---|---|
| 5,672,403 A | 9/1997 | Hara et al. | |
| 5,709,440 A | 1/1998 | Lecours | |
| 5,961,902 A | 10/1999 | Ishitoya et al. | |
| 6,007,166 A | 12/1999 | Tucker et al. | |
| 6,234,264 B1 | 5/2001 | Boivin et al. | |
| 6,406,655 B1 | 6/2002 | Courtemanche | |
| 6,482,508 B1 | 11/2002 | Persson et al. | |
| 6,536,852 B2 * | 3/2003 | Katayama et al. | 305/170 |
| 6,769,746 B2 * | 8/2004 | Rodgers et al. | 305/166 |
| 6,800,686 B2 | 10/2004 | Blanchon | |
| 6,974,196 B2 * | 12/2005 | Gagne et al. | 305/166 |
| 6,976,742 B2 | 12/2005 | Girard et al. | |
| 7,051,829 B2 | 5/2006 | Wahl | |
| 7,090,312 B2 | 8/2006 | Soucy et al. | |
| 2001/0008687 A1 | 7/2001 | Kollaja et al. | |
| 2003/0019133 A1 * | 1/2003 | Hori | 37/466 |
| 2003/0034690 A1 * | 2/2003 | Hori et al. | 305/191 |
| 2003/0047996 A1 | 3/2003 | Soucy et al. | |
| 2003/0194935 A1 | 10/2003 | Schlomski et al. | |
| 2004/0145095 A1 | 7/2004 | McCollum et al. | |
| 2005/0103540 A1 | 5/2005 | Lavoie | |
| 2005/0287891 A1 | 12/2005 | Park | |
| 2006/0103236 A1 | 5/2006 | Soucy et al. | |
| 2006/0125318 A1 | 6/2006 | Soucy et al. | |
| 2006/0175108 A1 | 8/2006 | Kubota | |
| 2007/0046100 A1 * | 3/2007 | McGilvrey et al. | 305/165 |
| 2009/0224598 A1 * | 9/2009 | St-Amant et al. | 305/165 |

FOREIGN PATENT DOCUMENTS

| | | |
|---|---|---|
| EP | 1 291 270 B1 | 6/2005 |
| EP | 1 564 118 A1 | 8/2005 |
| GB | 2 077 203 | 12/1981 |
| JP | 06072362 A * | 3/1994 |

OTHER PUBLICATIONS

Written Opinion of the International Search Authority for PCT/US07/04607 issued by International Search Authority/US on Oct. 3, 2007.

Written Opinion for International Application No. PCT/US2007/04607 issued by ISA/US dated Oct. 3, 2007.

* cited by examiner

LIGHT WEIGHT TRACK FOR A SNOWMOBILE

CROSS-REFERENCE TO RELATED APPLICATIONS

This application claims the benefit of U.S. Provisional Application Ser. No. 60/885,165 filed on Jan. 16, 2007, which is expressly incorporated by reference herein. PCT Application Serial No. PCT/US2007/004607, filed on Feb. 21, 2007, is also incorporated by reference herein.

BACKGROUND AND SUMMARY OF THE INVENTION

The present invention relates to a ground engaging track which is driven by a drive sprocket to move a vehicle across the ground. More particularly, the present invention relates to a light weight track for use with an off road vehicle such as, for example, a snowmobile.

Snowmobiles are commonly used for trail riding and utility applications. Trail riding on a snowmobile allows a snowmobile enthusiast to travel through areas which are not accessible by other types of vehicles. For example, snowmobiles can travel very rapidly across frozen lakes during the winter in northern climates. Modern snowmobiles, can cover ground very rapidly and can cover great distances.

Snowmobiles typically include a ground engaging track driven by the snowmobile engine to propel the machine. The track is supported beneath a vehicle chassis by a rear suspension which provides a comfortable ride and helps absorb the shock of the snowmobile crossing uneven terrain.

It is desirable to reduce the overall weight of the snowmobile to increase the range that a snowmobile may cover. The present invention helps reduce the weight of the track used to propel the snowmobile.

In one illustrated embodiment of the present invention, a ground engaging track for use with a vehicle having a drive sprocket comprises a continuous loop body portion having an exterior surface to engage the ground and an interior surface including driven members configured to be engaged by the drive sprocket to rotate the body portion and move the vehicle. The body portion is formed from a polymeric material having a Young's modulus greater than 10,000 psi.

In another illustrated embodiment of the present invention, a ground engaging track for use with a vehicle having a drive sprocket comprises a body portion having an exterior surface to engage the ground and an interior surface having driven members configured to be engaged by the drive sprocket to rotate the body portion and move the vehicle. The body portion is molded from a polymeric material having a Young's modulus greater than 10,000 psi. The track further comprises a plurality of reinforcement members molded into the body portion.

In yet another illustrated embodiment of the present invention, a ground engaging track for use with a vehicle having a drive sprocket comprises a body portion having an interior surface including a plurality of drive lugs. The plurality of drive lugs are longitudinally spaced apart to provide driven members configured to be engaged by the drive sprocket to rotate the body portion and move the vehicle. The body portion and the plurality of drive lugs are integrally formed from a polymeric material having a degree of crystallinity greater than or equal to 50%.

In still another illustrated embodiment of the present invention, a ground engaging track for use with a vehicle having a drive sprocket comprises an endless belt body portion having an interior surface including a plurality of drive lugs formed integrally with the body portion. The plurality of drive lugs are longitudinally spaced apart to provide driven members configured to be engaged by the drive sprocket to rotate the body portion and move the vehicle. The body portion also has an exterior surface including a plurality of tread lugs formed integrally with the body portion and configured to engage the ground. A first set of tread lugs is longitudinally aligned with the drive lugs and a second set of tread lugs being longitudinally aligned with spaces between adjacent drive lugs.

In a further illustrated embodiment of the present invention, a ground engaging track for use with a vehicle having a drive sprocket comprises an endless belt body portion having an exterior surface to engage the ground and an interior surface having driven members configured to be engaged by the drive sprocket to rotate the endless belt body portion and move the vehicle. The body portion has a thickness less than 0.2 inch.

In a still further illustrated embodiment of the present invention, a ground engaging track for use with a vehicle having a drive sprocket comprises a continuous loop body portion having an exterior surface to engage the ground and an interior surface including members configured to be engaged by the drive sprocket to rotate the body portion and move the vehicle. The body portion is formed from a polymeric material having a molecular weight greater than two million Daltons.

Additional features of the invention will become apparent to those skilled in the art upon consideration of the following detailed description of the best mode of carrying out the invention as presently perceived.

BRIEF DESCRIPTION OF THE DRAWINGS

The detailed description particularly refers to the accompanying figures in which.

DETAILED DESCRIPTION OF THE ILLUSTRATED EMBODIMENTS

Figure 1:
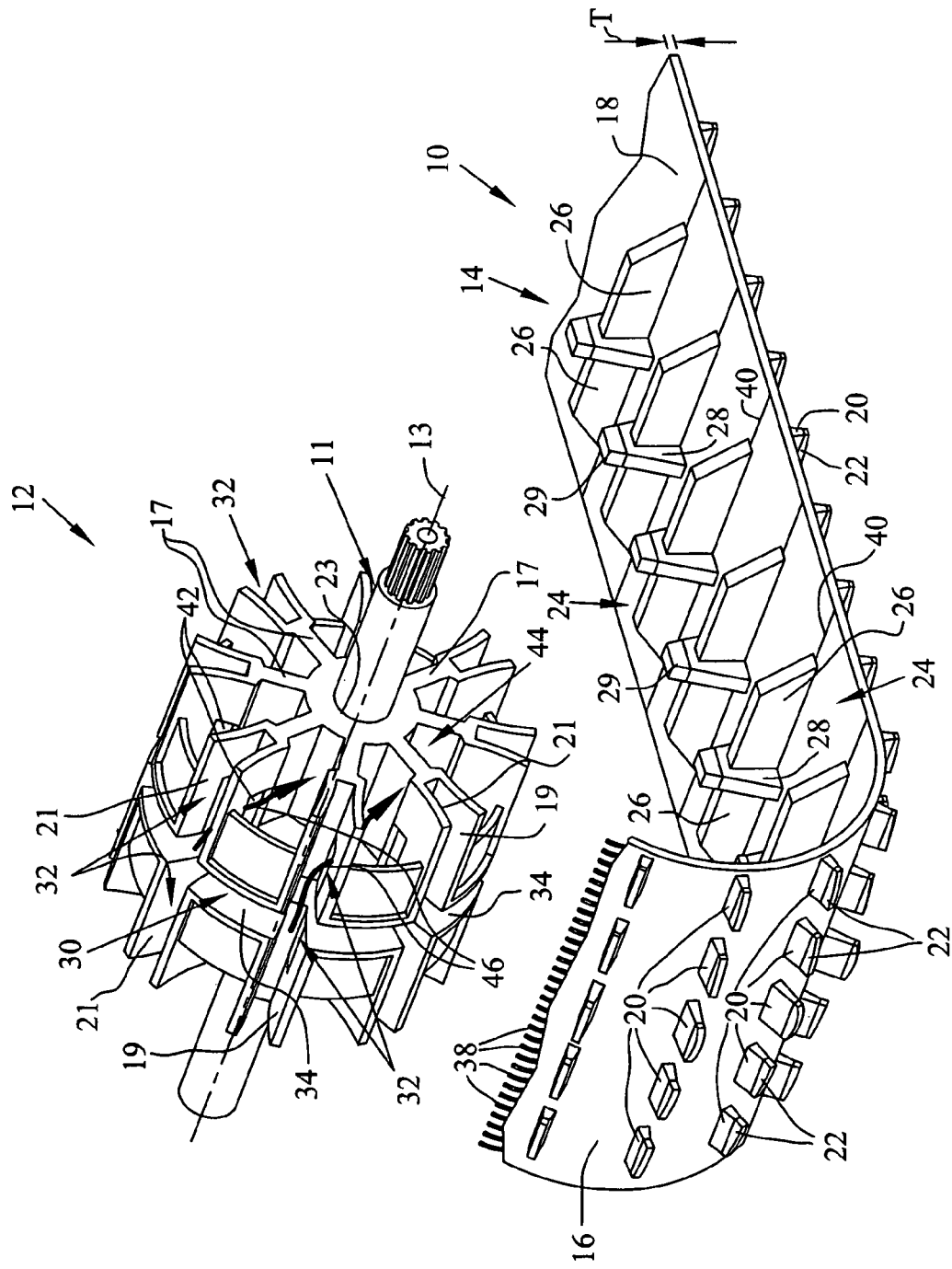
FIG. 1 is an exploded perspective view of an illustrated embodiment of a ground engaging track and a drive sprocket of the present invention for use with a vehicle.

Referring now to the drawings, FIG. 1 illustrates one embodiment of a ground engaging track 10 for use with a vehicle (not shown) having a drive sprocket 12. It should be appreciated that while a single drive sprocket 12 is shown, multiple drive sprockets may be implemented in other embodiments. It is understood that track 10 may be formed in configurations other than those described herein.

The vehicle typically includes an engine (not shown), such as an internal combustion engine, that is operatively connected to the track 10 via a drive axle 11. In a snowmobile embodiment, a continuously variable transmission (not shown) illustratively connects the engine to the drive axle 11 in a conventional manner. Drive sprocket 12 is mounted to the drive axle 11 for common rotational movement about a drive sprocket axis 13.

As illustrated in FIG. 1, drive sprocket 12 includes central hub 15 and a plurality of Y-shaped projections 17. Branches of the Y-shaped projections define a recessed portion 32 and spaced apart pairs of sprocket teeth 19, 21 that are configured to engage corresponding pairs of drive members 26 formed on track 10 as discussed below. Sprocket teeth 19, 21 therefore drive the track 10 upon rotation of the sprocket 12 about drive sprocket axis 13.

The sprocket 12 has a central bore 23 formed in hub 15 through which the drive axle 11 extends. The drive axle 11 is rigidly secured to the sprocket 12 in a conventional manner. The sprocket 12 and the Y-shaped projections 17 defining sprocket teeth 19, 21 are illustratively integrally formed from a strong, light material such as aluminum or plastic. Sprocket 12 may also be formed from other suitable material such as steel or a composite including carbon fibers. In other words, the exact composition of the sprocket 12 may be selected from a wide variety of substances without departing from the scope of the present invention. In addition, the sprocket teeth 19, 21 may be formed separately from the sprocket body and subsequently rigidly fastened (via glue, rivets, welds, bolts, etc.) to the sprocket 12.

Illustratively, drive sprocket 12 includes a central channel 30 defined by spaced apart walls 34. Channel 30 receives centering lugs 28 of track 10 therein as the sprocket 12 rotates as discussed below. The channel 30 may be implemented in other suitable configurations, if desired. Teeth 19, 21 of drive sprocket 12 are formed to include apertures 42 therein. Drive sprocket 12 defines cavities 44 in communication with apertures 42 for removal of snow, dirt and other debris as described in greater detail below.

FIG. 1 also illustrates track 10 including body portion 14 having an exterior surface 16 and an interior surface 18. Track 10 is illustratively formed from a polymeric material having a high elastic modulus as discussed below. Illustratively, the polymeric material has a Young's modulus greater than 10,000 psi and preferably much higher as discussed below. Preferably, the polymeric material is an ultra high molecular weight polyethylene.

In one embodiment, body portion 14 is molded or otherwise formed as a continuous loop. In another embodiment, body portion is an endless belt track. For purposes of this application, the term "continuous loop" defines a monolithic structure without connectors, couplers or splices. For purpose of this application, the term "endless belt" may include connectors, couplers or splices. In any event, it should be appreciated that alternative embodiments may be implemented in any other suitable configuration.

As previously mentioned, body portion 14 has exterior surface 16 and interior surface 18. The thickness of the body portion 14 of track 10 (distance between exterior surface 16 and interior surface 18) as illustrated by dimension T is less preferably than about 0.2 inch. Illustratively, the thickness is preferably between about 0.2 inch and about 0.1 inch. As illustrated in FIG. 1, body portion 14 is thin enough to be flexible.

Exterior surface 16 includes a plurality of tread lugs 20 configured to engage the ground. Tread lugs 20 are illustratively integrally formed with body portion 14 of track 10. Therefore, tread lugs 20 are also formed from the same polymeric material as the body portion. As illustrated in FIG. 1, tread lugs 20 protrude from the exterior surface 16 of body portion 14. It should also be appreciated that tread lugs 20 may have different shapes and sizes than illustrated in FIG. 1.

Optionally, tread tips 22 are coupled to tread lugs 20. Tread tips 22 are illustratively formed from a second material which is more elastic than the polymeric material of body portion 14 and tread lugs 20. Illustratively, the elastomeric second material has a Young's modulus less than or equal to 5,000 psi and preferably less than or equal to 2,000 psi. For example, tips 22 may be formed from rubber having a Young's modulus of about 1,500 psi.

Tread tips 22 are either co-molded to tread lugs 20 or fastened to tread lugs 20 by any suitable means, such as adhesive. The optional tread tips 22 provide greater traction on hard or icy surfaces. The optional tread tips 22 also reduce noise when track 10 is operated over hard surfaces compared to an embodiment of the track 10 without the tips 22 on the tread lugs 20.

Interior surface 18 includes integrally formed drive lugs 24 which provide driven members 26 that are configured to engage drive sprocket teeth 19, 21. Centering lugs 28 are located between the drive members 26. Drive lugs 24 and centering lugs 28 are illustratively integrally formed from the same polymeric material as the body portion 14. Drive members 26 are configured to be engaged by drive sprocket teeth 19, 21 as the sprocket 12 rotates to rotate body portion 14 and move the vehicle. Centering lugs 28 are configured to enter the central channel 30 of drive sprocket 12 to maintain position of body portion 14 of track 10 relative to drive sprocket 12.

Optionally, centering tips 29 are coupled to centering lugs 28. Centering tips 29 are illustratively formed from a second material which is more elastic than the polymeric material of body portion 14, drive lugs 24 and centering lugs 28. Illustratively, the elastomeric second material has a Young's modulus less than 5,000 psi and preferably less than 2,000 psi. For example, tips 29 may be formed from rubber having a Young's modulus of about 1,500 psi.

Centering tips 29 are either co-molded to centering lugs 28 or fastened to centering lugs 28 by any suitable means, such as adhesive. The optional centering tips 29 may provide greater traction against drive sprocket 12 and may be quieter than an embodiment of track 10 including centering lugs 28 without the tips.

In another embodiment, a track (not shown) is formed to include drive apertures adjacent drive lugs 24. This track embodiment is driven by a sprocket as illustrated in U.S. Pat. No. 7,051,829 to Wahl which is incorporated herein by reference. In this embodiment, centering lugs 28 are not typically used.

As shown in FIG. 1, drive members 26 are spaced apart longitudinally along track 10 disposed along lateral axes 40. Tread lugs 20 are similarly spaced apart along track 10 disposed along lateral axes 40. It should be appreciated that while tread lugs 20 are shown disposed along lateral axes 40, tread lugs 20 may be implemented at a different, illustratively, higher frequency, as discussed in more detail in FIG. 3. Track 10 is capable of supporting tread lugs 20 at a higher frequency, in part because of flexibility provided by the polymeric material composition of track 10.

A plurality of tread lugs 20 are illustratively disposed along a single lateral axis 40. A plurality of sets of tread lugs 20 are disposed parallel to other sets of tread lugs 20. It should be appreciated that tread lugs 20 may be implemented in other suitable configurations.

Optionally, reinforcement members 38 are illustratively embedded within body portion 14. Reinforcement members 38 are illustratively formed from polymeric material having a Young's modulus greater than about 75,000 psi and preferably greater than about 95,000 psi. For example, reinforcement members 38 are made from aramid fibers or a polyester material.

During operation, snow, dirt and other debris can collect on the interior surface 18 of track 10, on drive members 26, and on drive sprocket 12. Apertures 42 formed in sprocket teeth 19, 21 are in communication with cavities 44 to allow snow, dirt and other debris to move through apertures 42 in the directions of arrows 46 as the sprocket 12 rotates to move the track 10. Movement of the snow, dirt or other debris in the direction of arrows 46 allows for removal of the snow, dirt and other debris from interior surface 18, drive members 26 and drive sprocket 12.

Figure 2:
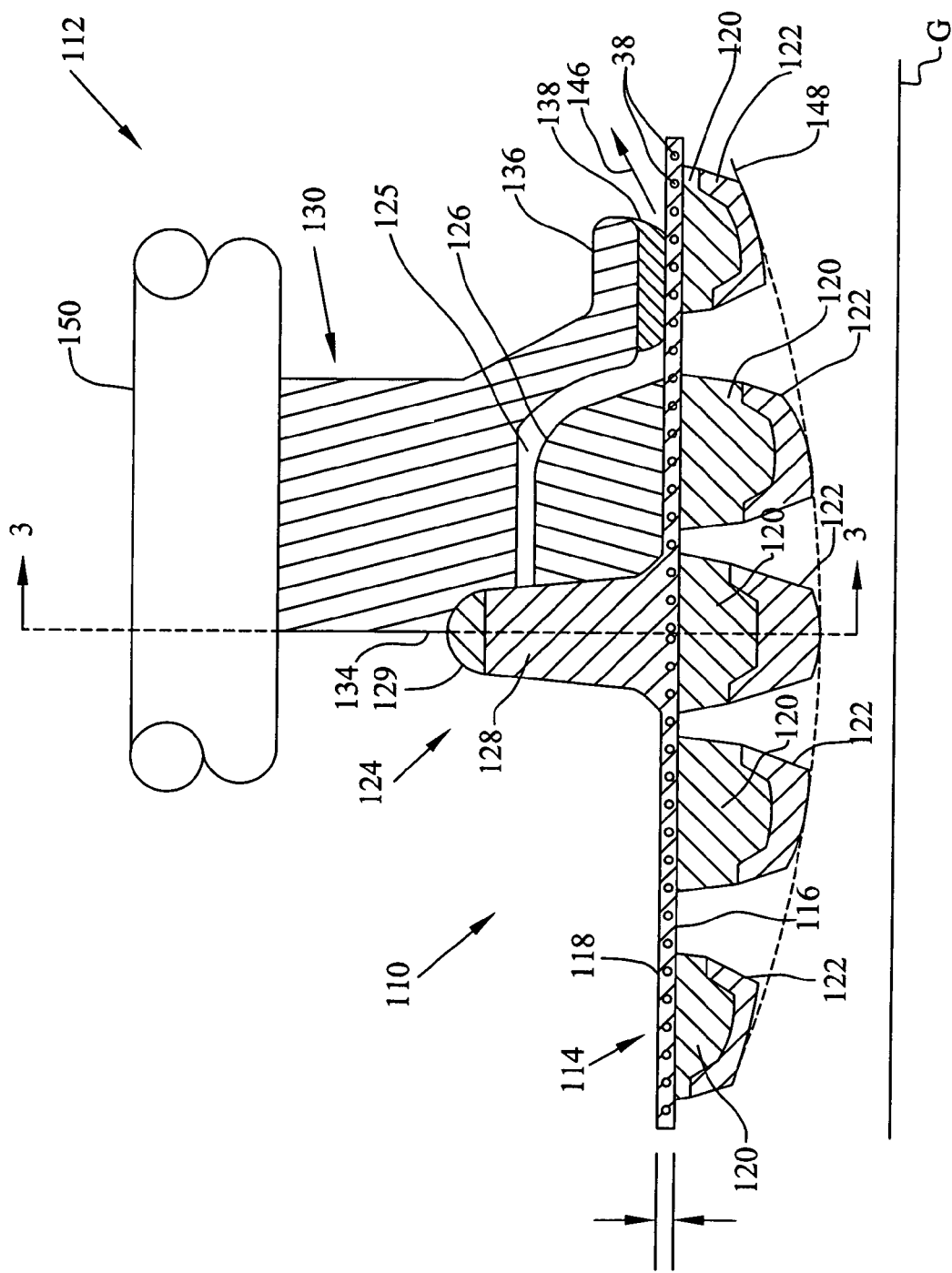
FIG. 2 is a cross-sectional view of another illustrated embodiment of the present invention illustrating another exemplary ground engaging track for use with a vehicle having a drive sprocket.
Figure 3:
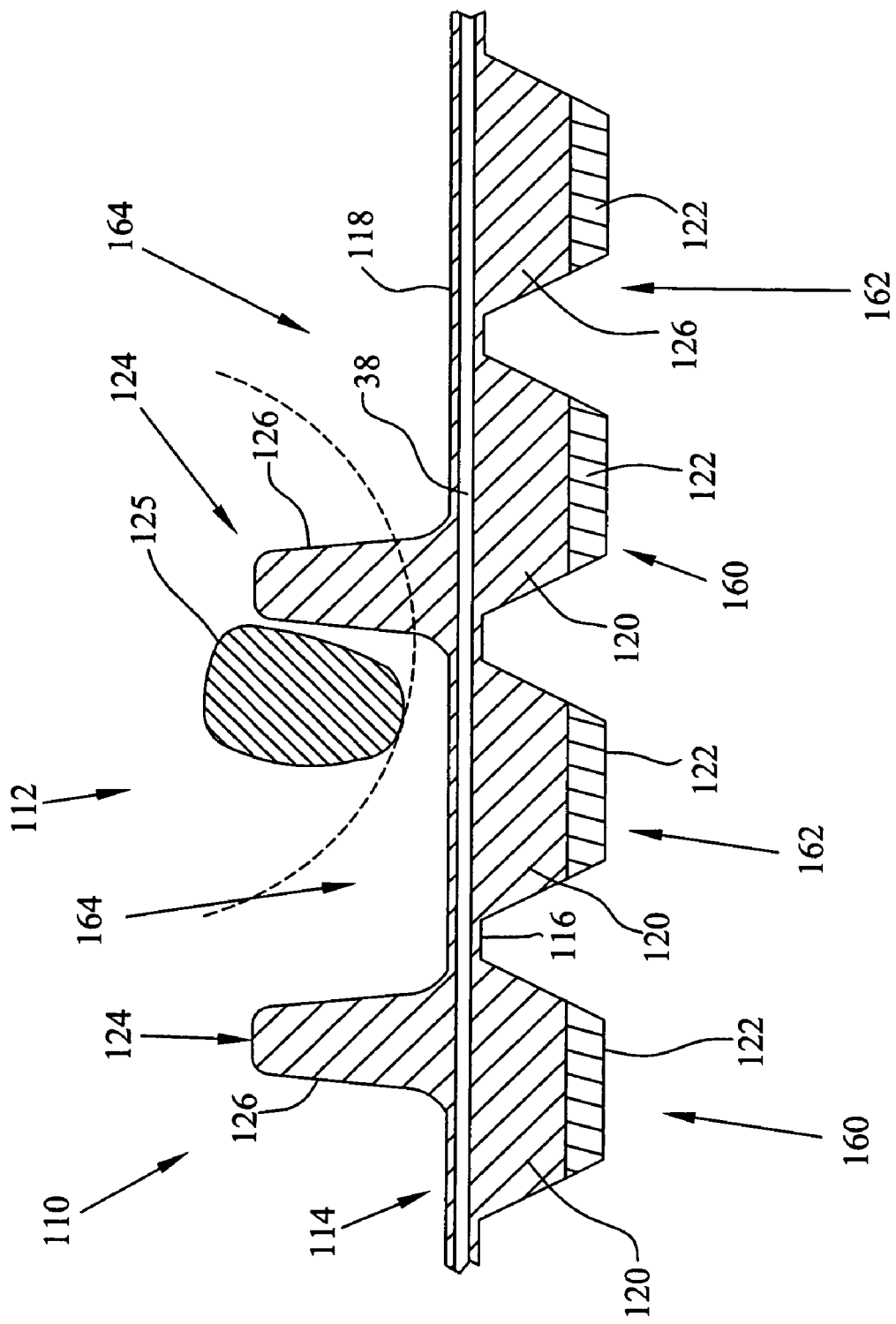
FIG. 3 is another cross-sectional view further illustrating the ground engaging track and drive sprocket of FIG. 2.

FIGS. 2 and 3 illustrate another embodiment of a ground engaging track 110 for use with a vehicle (not shown) having a drive sprocket 112. This embodiment is substantially similar to the previous embodiment and provides additional features applicable to all embodiments. It is understood that this embodiment may incorporate all of the features of the previous embodiment.

FIG. 2 illustrates track 110 including body portion 114 having exterior surface 116 and interior surface 118. Exterior surface 116 includes tread lugs 120 configured to engage the ground. Tread lugs 120 define a generally convex ground engaging surface as illustrated by dashed line 148. Convex ground engaging surface illustrated by dashed line 148 allows for pivoting of track 10 against ground G. Optionally tread tips 122 are coupled to tread lugs 120.

Still referring to FIG. 2, interior surface 118 includes integrally formed drive lugs 124 including drive members 126 configured to be engaged by teeth 125 of drive sprocket 112 as the sprocket 112 rotates. Only half of the drive sprocket 112 is shown in FIG. 2 with the other half being a mirror image. Drive lugs 124 provide driven members 126. Centering lugs 128 are also integrally formed with interior surface 118 of track 110. Centering lugs 128 are configured to enter a central channel 134 of drive sprocket 112 to maintain position of body portion 114 relative to drive sprocket 112. Optional centering tips 129 are coupled to centering lugs 128 as discussed above. The optional centering tips 129 provide quieter operation compared to an embodiment of track 110 including centering lugs 128 alone without the optional centering tips 129.

Illustratively, drive sprocket 112 is coupled to drive axle 150. Sprocket includes a plurality of teeth 125 which are configured to engage the drive members 126 as the sprocket 112 rotates. Teeth 125 include lateral members 136 having a ramp surface 138 which is configured to aid in removal of snow, dirt and other debris. During operation, snow, dirt and other debris can deposit on the interior surface 118, on drive members 124, and on drive sprocket 112. Space between lateral member 136 and interior surface 118 and the ramp surface 138 facilitate movement of snow, dirt and debris in the direction of arrow 146 to remove the snow, dirt and other debris from interior surface 118, drive members 124 and drive sprocket 112.

Still referring to FIG. 2, body portion 114 optionally includes embedded reinforcement members 38 to increase the tensile strength of body portion 114 and minimize longitudinal stretching of track 110. While FIG. 2 shows reinforcement members 38 arranged longitudinally, it should be understood that the arrangement of reinforcement members 38 in relation to body portion 114 is not limited to any arrangement. Reinforcement members 38 are optionally made from aramid fibers or polyester.

FIG. 3 shows a cross sectional view of the ground engaging track 110 of FIG. 2. As previously disclosed, track 110 includes body portion 114 which includes, among other things, drive members 126. Drive sprocket 112 includes teeth 125 which are configured to engage drive members 126 as drive sprocket 112 rotates to rotate body portion 114 and move the vehicle (not shown).

As also shown in FIG. 3, track 110 includes tread lugs 120. It should be understood from reference to FIGS. 1, 2 that FIG. 3 illustrates several rows of tread lugs 120. It should also be noted that there are more rows of tread lugs 120 than drive members 126. First sets 160 of tread lugs 120 are longitudinally aligned with the drive lugs 124 and second sets 162 of tread lugs 120 are longitudinally aligned with spaces 164 between adjacent drive lugs 124. Tread lugs 120 formed on exterior surface 116 may be located between drive members 126 due to the flexibility provided by the polymeric material composition of track 110.

Description of the Polymeric Material of the Track

As discussed above, the body portion 14, 114 of the track and well as tread lugs 20, 120, drive lugs 24, 124 and centering lugs 28, 128 are illustratively integrally formed from a polymeric material having a Young's modulus greater than 10,000 psi. In other illustrated embodiments the polymeric material has a Young's modulus greater than or equal to 25,000 psi, greater than or equal to 50,000 psi, or greater than or equal to 75,000 psi. In preferred embodiments, the polymeric material is ultra high molecular weight polyethylene having a Young's modulus greater than about 95,000 psi.

The polymeric material of the body portion 14, 114, tread lugs 20, 120, drive lugs 24, 124 and centering lugs 28, 128 may also be defined in terms of the degree of crystallinity of the polymeric material. Illustratively, the polymeric material has a degree of crystallinity greater than or equal to 50%. In other illustrated embodiments the polymeric material has a degree of crystallinity between about 55% and 85%. In preferred embodiments, the polymeric material has a degree of crystallinity greater than or equal to 85%

The polymeric material of the body portion 14, 114, tread lugs 20, 120, drive lugs 24, 124 and centering lugs 28, 128 may also be defined in terms of the molecular weight of the polymeric material. The polymeric material illustratively has a molecular weight greater than two million Daltons. In other illustrated embodiments the body portion is formed from a polymeric material having a molecular weight greater than three million Daltons, greater than four million Daltons, or greater than five million Daltons. In preferred embodiments, the polymeric material is ultra high molecular weight polyethylene having a having a molecular weight between about three million Daltons and about 5.7 million Daltons.

The properties of the polymeric material discussed herein permit the track to be formed from a thin sheet of the polymeric material. Illustratively, the body portion having a thickness less than 0.2 inch. Preferably, the body portion has a thickness between about 0.2 inch and about 0.1 inch.

It is understood that a track made of the polymeric material described herein is not limited to the specific track configurations illustrated herein. Any other configurations of drive lugs, tread lugs, and centering lugs may be used in accordance with the present invention. As discussed above, any desired sprocket configuration may also be used including multiple drive sprockets as is well known in the art. It is also understood that the track may be formed with or without centering lugs, depending on the track design.

Although the invention has been described in detail with reference to certain illustrated embodiments, variations and modifications exist within the scope and spirit of the present invention as described and defined in the following claims.

What is claimed is:

1. A ground engaging track for use with a vehicle having a drive sprocket, the track comprising a continuous loop body portion having an exterior surface including a plurality of tread lugs configured to engage the ground and an interior surface including driven members configured to be engaged by the drive sprocket to rotate the body portion and move the vehicle, the body portion and the plurality of tread lugs being formed from a polymeric material having a Young's modulus greater than 10,000 psi, and further comprising a second material located on at least one of the plurality of tread lugs, the second material being more elastic than the polymeric material.

2. The track of claim 1, wherein the body portion is formed from a polymeric material having a Young's modulus greater than or equal to 25,000 psi.

3. The track of claim 1, wherein the body portion is formed from a polymeric material having a Young's modulus greater than or equal to 50,000 psi.

4. The track of claim 1, wherein the body portion is formed from a polymeric material having a Young's modulus greater than or equal to 75,000 psi.

5. The track of claim 1, wherein the body portion is formed from a polymeric material having a Young's modulus greater than or equal to 95,000 psi.

6. The track of claim 1, wherein the body portion is formed from a polymeric material having a Young's modulus greater than or equal to 100,000 psi.

7. The track of claim 1, wherein the body portion is formed from a polymeric material having a Young's modulus greater than or equal to 110,000 psi.

8. The track of claim 1, wherein the body portion is formed from a polymeric material having a Young's modulus greater than or equal to 125,000 psi.

9. The track of claim 1, wherein the interior surface of the body portion includes a plurality of drive lugs which provide the driven members, the plurality of drive lugs also being formed from the same polymeric material.

10. The track of claim 9, wherein the second material is also located on at least one of the plurality of drive lugs.

11. The track of claim 1, wherein the second material is molded onto the exterior surface of the body portion.

12. The track of claim 1, wherein the second material has a Young's modulus less than or equal to 5,000 psi.

13. The track of claim 1, wherein the second material has a Young's modulus less than or equal to 2,000 psi.

14. The track of claim 1, further comprising a plurality of reinforcement members molded into the body portion.

15. The track of claim 14, wherein the plurality of reinforcement members include a plurality of first elongated members extending in a first direction and a plurality of second elongated members extending in a second direction generally orthogonal to the first direction.

16. The track of claim 14, wherein the plurality of reinforcement members are formed from an aramid fiber.

17. The track of claim 14, wherein the plurality of reinforcement members are formed from a polyester having a Young's modulus greater than 75,000 psi.

18. The track of claim 1, wherein the interior surface is formed to include a plurality of drive lugs formed integrally with the belt, the plurality of drive lugs being longitudinally spaced apart to provide the driven members, and wherein the plurality of tread lugs include a first set of tread lugs longitudinally aligned with the drive lugs and a second set of tread lugs longitudinally aligned with spaces between adjacent drive lugs.

19. The track of claim 1, wherein the body portion has a thickness less than 0.2 inch.

20. The track of claim 1, wherein the belt has a thickness of less than or equal to 0.175 inch.

21. The track of claim 1, wherein the belt has a thickness of less than or equal to 0.15 inch.

22. The track of claim 1, wherein the belt has a thickness of about 0.10 inch.

23. A ground engaging track for use with a vehicle having a drive sprocket, the track comprising a body portion having and an exterior surface including a plurality of tread lugs configured to engage the ground and an interior surface including a plurality of drive lugs, the plurality of drive lugs being longitudinally spaced apart to provide driven members configured to be engaged by the drive sprocket to rotate the body portion and move the vehicle, the body portion, the plurality of tread lugs, and the plurality of drive lugs being integrally formed from a polymeric material having a degree of crystallinity greater than or equal to 50%, and further comprising a second material located on the plurality of tread lugs, the second material being more elastic than the polymeric material.

24. The track of claim 23, wherein the polymeric material has a degree of crystallinity greater than or equal to 55%.

25. The track of claim 23, wherein the polymeric material has a degree of crystallinity greater than or equal to 60%.

26. The track of claim 23, wherein the polymeric material has a degree of crystallinity greater than or equal to 62%.

27. The track of claim 23, wherein the polymeric material has a degree of crystallinity greater than or equal to 85%.

28. A ground engaging track for use with a vehicle having a drive sprocket, the track comprising an endless belt body portion having an interior surface including a plurality of drive lugs formed integrally with the body portion, the plurality of drive lugs being longitudinally spaced apart to provide driven members configured to be engaged by the drive sprocket to rotate the body portion and move the vehicle, the body portion also having an exterior surface including a plurality of tread lugs formed integrally with the body portion and configured to engage the ground, a first set of tread lugs being longitudinally aligned with the drive lugs and a second set of tread lugs being longitudinally aligned with spaces between adjacent drive lugs, and wherein the body portion, the plurality of drive lugs and the plurality of tread lugs are formed from a first material having a Young's modulus greater than 10,000 psi and wherein a second material is located on the plurality of tread lugs, the second material being more elastic than the first material.

29. The track of claim 28, wherein the belt has a thickness of less than or equal to 0.2 inch.

30. The track of claim 28, wherein the body portion is formed from a polymeric material having a Young's modulus greater than or equal to 10,000 psi.

31. The track of claim 30, wherein the polymeric material has a degree of crystallinity greater than or equal to 50%.

32. The track of claim 28, wherein the body portion is formed from a polymeric material having a molecular weight greater than two million Daltons.

33. A ground engaging track for use with a vehicle having a drive sprocket, the track comprising a continuous loop body portion having an exterior surface including a plurality of tread lugs configured to engage the ground and an interior surface including members configured to be engaged by the drive sprocket to rotate the body portion and move the vehicle, the body portion and the plurality of tread lugs being formed from a polymeric material having a molecular weight greater than two million Daltons, and further comprising a second material located on at least one of the plurality of tread lugs, the second material being more elastic than the polymeric material.

34. The track of claim 33, further comprising a plurality of reinforcement members molded into the body portion.

35. The track of claim 33, wherein the sprocket includes a central recessed portion and the interior surface of the body portion includes a plurality of centering lugs which cooperate with the central recessed portion of the sprocket to maintain a position of the body portion relative to the sprocket, the plurality of centering lugs being formed from the same polymeric material as the body portion.

36. The track of claim 35, wherein the second material is also located on at least one of the plurality of centering lugs.

37. The track of claim 36, wherein the second material is molded onto the interior surface of the body portion onto at least one of the centering lugs.

38. The track of claim 36, wherein the second material is amorphic.

39. The track of claim 36, wherein the second material is rubber.

40. The track of claim 36, wherein the second material has a Young's modulus less than or equal to 5,000 psi.

41. The track of claim 38, wherein the second material has a Young's modulus less than or equal to 2,000 psi.

42. The track of claim 33, wherein the body portion is formed from a polymeric material having a molecular weight greater than three million Daltons.

43. The track of claim 33, wherein the body portion is formed from a polymeric material having a molecular weight greater than four million Daltons.

44. The track of claim 33, wherein the body portion is formed from a polymeric material having a molecular weight greater than five million Daltons.

45. The track of claim 33, wherein the polymeric material is ultra high molecular weight polyethylene.

46. A ground engaging track for use with a vehicle having a drive sprocket, the track comprising a continuous loop body portion having an exterior surface to engage the ground and an interior surface including drive lugs configured to be engaged by the drive sprocket to rotate the body portion and move the vehicle, the body portion and the drive lugs being formed from a polymeric material having a Young's modulus greater than 10,000 psi, and further comprising a second material located on at least one of the plurality of drive lugs, the second material being more elastic than the polymeric material.

47. The track of claim 46, wherein the body portion is formed from a polymeric material having a Young's modulus greater than or equal to 100,000 psi.

48. The track of claim 46, wherein the second material has a Young's modulus less than or equal to 5,000 psi.

49. The track of claim 46, wherein the second material has a Young's modulus less than or equal to 2,000 psi.

50. A ground engaging track for use with a vehicle having a drive sprocket including a central recessed portion, the track comprising a continuous loop body portion having an exterior surface to engage the ground and an interior surface including drive members configured to be engaged by the drive sprocket to rotate the body portion and move the vehicle and a plurality of centering lugs which cooperate with the central recessed portion of the sprocket to maintain a position of the body portion relative to the sprocket, the body portion and the plurality of centering lugs being formed from a polymeric material having a molecular weight greater than two million Daltons, and further comprising a second material located on at least one of the plurality of centering lugs, the second material being more elastic than the polymeric material.

51. The track of claim 50, wherein the second material is molded onto the interior surface of the body portion onto at least one of the centering lugs.

52. The track of claim 50, wherein the second material is amorphic.

53. The track of claim 50, wherein the second material is rubber.

54. The track of claim 50, wherein the second material has a Young's modulus less than or equal to 5,000 psi.

55. The track of claim 50, wherein the second material has a Young's modulus less than or equal to 2,000 psi.

* * * * *

UNITED STATES PATENT AND TRADEMARK OFFICE
CERTIFICATE OF CORRECTION

| | | |
|---|---|---|
| PATENT NO. | : 7,866,766 B2 | |
| APPLICATION NO. | : 12/009016 | |
| DATED | : January 11, 2011 | |
| INVENTOR(S) | : Berg | |

It is certified that error appears in the above-identified patent and that said Letters Patent is hereby corrected as shown below:

In claim 41, at column 9, line 21, replace number "38" with --36--.

Signed and Sealed this
Fourteenth Day of June, 2011

David J. Kappos
*Director of the United States Patent and Trademark Office*